United States Patent [19]

Meyerle

[11] Patent Number: 4,976,666
[45] Date of Patent: Dec. 11, 1990

[54] CONTINUOUS SPEED-CHANGE BRANCHED GEAR, IN PARTICULAR FOR MOTOR VEHICLES

[76] Inventor: Michael Meyerle, Kiefernweg 9, D-7996 Meckenbeuren-Lochbrucke, Fed. Rep. of Germany

[21] Appl. No.: 154,351
[22] PCT Filed: Apr. 8, 1987
[86] PCT No.: PCT/DE87/00157
  § 371 Date: Feb. 9, 1988
  § 102(e) Date: Feb. 9, 1988
[87] PCT Pub. No.: WO87/06316
  PCT Pub. Date: Oct. 22, 1987

[30] Foreign Application Priority Data

Apr. 10, 1986 [DE] Fed. Rep. of Germany ....... 3612037
Mar. 20, 1987 [DE] Fed. Rep. of Germany ....... 3709191

[51] Int. Cl.$^5$ ............................................. F16H 47/04
[52] U.S. Cl. ......................................... 475/83; 475/76
[58] Field of Search ............... 74/687; 475/72, 76, 475/78, 80, 83

[56] References Cited

U.S. PATENT DOCUMENTS

| | | | |
|---|---|---|---|
| 3,969,957 | 7/1976 | DeLalio | 74/687 |
| 4,114,475 | 9/1978 | Orshansky, Jr. et al. | 74/687 |
| 4,164,155 | 8/1979 | Reed | 74/687 |
| 4,164,156 | 8/1979 | Reed | 74/687 |
| 4,291,592 | 9/1981 | Meyerle et al. | 74/687 |
| 4,373,359 | 2/1983 | Ehrlinger et al. | 74/687 |
| 4,382,392 | 5/1983 | Meyerle et al. | 74/687 |
| 4,434,681 | 3/1984 | Friedrich et al. | 74/687 |
| 4,799,401 | 1/1989 | Reed | 74/687 X |

FOREIGN PATENT DOCUMENTS 2037915 7/1980 United Kingdom ................. 74/687

Primary Examiner—Dwight G. Diehl
Attorney, Agent, or Firm—Staas & Halsey

[57] ABSTRACT

A continuously variable split-path transmission particularly for motor vehicles comprises a stepless converter with a summation planetary gear unit for adding up the power which is split at the input shaft of the transmission into two power transmission paths. The specific requirements imposed on the stepless converter are minimal, and thus the efficiency values are favorable. The primary and secondary components of the stepless converter are small and can be advantageously incorporated into a modular unit. It is also possible to adapt such components to the specific requirements of different motor vehicles. The summation planetary gear is linked via a series of clutches to a second planetary gear unit having planetary elements which can be reciprocally coupled to each other.

20 Claims, 4 Drawing Sheets

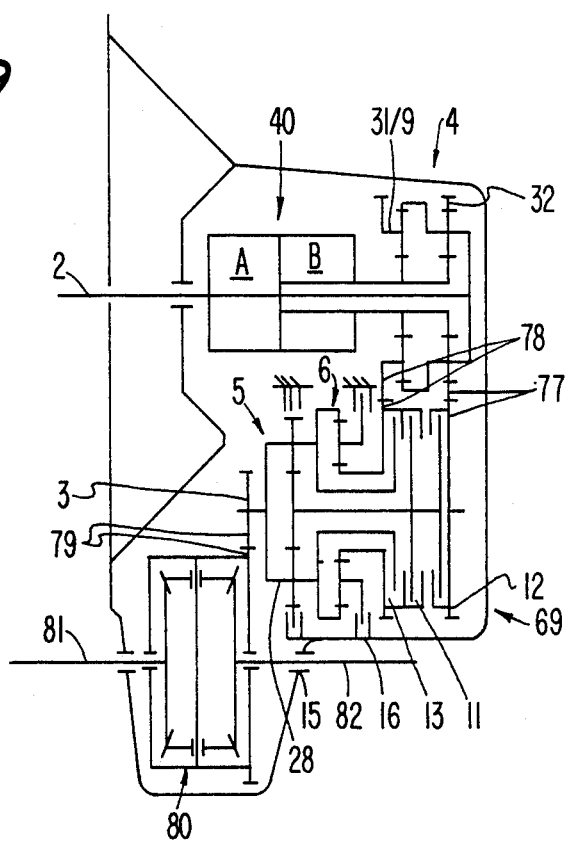

CONTINUOUS SPEED-CHANGE BRANCHED GEAR, IN PARTICULAR FOR MOTOR VEHICLES

The invention relates to a continuously variable split-path transmission, particularly for motor vehicles, having at least three forward operating ranges and consisting of a stepless converter comprised of a primary unit and a secondary unit, a four-shaft summation planetary gear train for adding up the power, which is split at the input of the transmission into two multiple power transmission paths, and a downstream second planetary gear unit, whereby the input shaft is in permanent driving connection with the primary unit and with a first shaft of the summation planetary gear train, and the secondary unit is also permanently connected to a second shaft of the summation planetary gear train.

Continuously variable transmissions of this type are already known through DE-PS No. 27 16 960, DE-OS No. 27 58 659, DE-AS No. 24 15 002, DE-OS No. 31 25 123. These transmission systems, however, each have only two forward operating ranges, with the disadvantage that relatively large hydrostatic units are required, in contrast to the subject of the invention. Through EP No. 0 105 515, another similar transmission model with a flexible drive mechanism is known which, similar to the aforementioned transmission models, have only two forward operating ranges despite the relatively great technical efforts. Accordingly, the stepless converter of this transmission model is heavily loaded, which necessitates correspondingly large dimensions, i.e., the total conversion range of the transmission is small when compared with the mechanism that is the subject of the invention.

The object of the invention is to provide a continuously variable split-path transmission system which possesses at least three forward drive systems and facilitates the use of small, continuously variable converting mechanisms and permits vehicle-friendly, compact constructions for different applications.

This object is solved through the provision of a transmission wherein the output shafts of the summation planetary gear are each selectively connectable with the second planetary gear unit and one shaft of the latter is in permanent driving connection with the transmission output shaft.

The invention will be explained with reference to specific embodiments in conjunction with the accompanying drawings, in which:

FIG. 9 is a schematic representation of a specific embodiment with a planetary gear unit positioned in parallel relative to the range clutches and with a differential axle, e.g., for a passenger vehicle with transverse drive.

FIG. 10 is a schematic representation of a specific embodiment of the transmission with the hydrostatic drive unit displaced laterally in parallel relative to other components.

Figure 1:
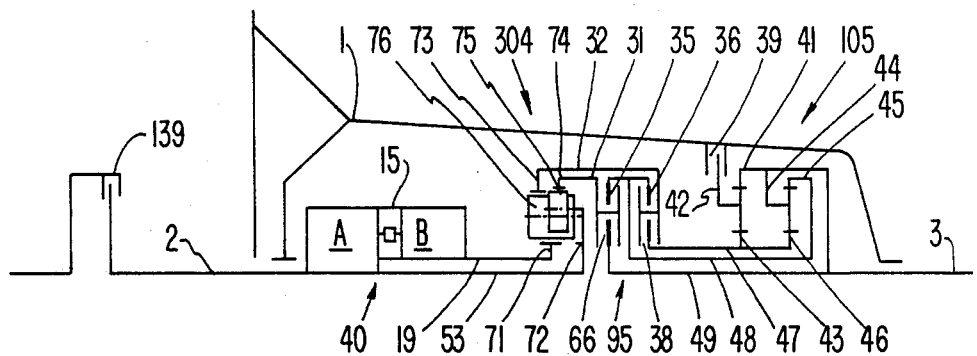
FIG. 1 is a schematic representation of a first specific embodiment with a hydrostatic converter, four forward operating ranges and one reverse drive range.

The split-path transmission in accordance with the invention consists of a stepless converter 40; 140 arranged at the input, a four-shaft summation planetary gear train 4; 104; 204; 304; 404; 504, and a second planetary gear unit 105; 205; 305; 405. The summation planetary gear train 4; 104; 204; 304; 404; 504 is permanently connected to the input shaft 2 by first shaft 53 thereof and to a primary unit A; C, of a stepless converter and a the second shaft 19 thereof is permanently connected to the secondary unit B; D of the converter. Depending on the speed range involved the third and fourth shafts of the summation planetary gear train 31, 32 alternately may brought into driving connection with the second planetary transmission gear unit 105; 205; 305; 405 by closing the clutches 11; 12; 13; 15; 16 or 35; 36; 38; 66. The power, which is split at the input to the transmission into a variable gear ratio path and a non-variable gear ratio path is added up in the summation planetary gear train 4; 104; 204; 304; 404; 504 and transmitted via the third shaft 31 or fourth shaft 32 by means of corresponding clutches 69; 95; 98 to the second planetary gear unit 105; 205; 305; 405 and to the output shaft 3, which is permanently joined thereto. The summation planetary gear train 4; 104; 204; 304; 404; 505 may have different designs, as shown in FIGS. 1, 2, 3, 4, 5, 6 and 7. Even the second planetary gear unit 105; 205; 305; 405 may have different designs, as shown in FIGS. 1; 3; 4 and 8, in which one shaft 41; 44; 28; 91 is always permanently joined to the output shaft 3. The transmission design of FIG. 8 has a second planetary gear unit consisting of three shafts—sun gear 20, planet carrier 28, internal gear 29—which is also provided with a reverse drive mechanism 129 to facilitate action as a reversing transmission. A shaft of the second planetary gear unit, planet carrier 28, is in permanent driving connection with a member of a range clutch 13, with another member of a range clutch 14, as well as with the output shaft 3.

The transmission design of FIG. 1 possesses four power-split forward operating ranges and one power-split reverse drive range. The stepless converter 40 consists of a hydrostatic primary unit A of adjustable volume and a hydrostatic secondary unit B preferably of constant volume. The split-path transmission 304 is so designed that in each shift range the full positive and negative adjustment of the hydrostatic unit can be utilized, i.e., the shifts occur at the particular adjustment limits of the hydrostatic drive. The clutch assembly 95 has four shift clutches 35, 36, 38 and 66. In the clutch assembly 95, two sets of two clutches each, 66, 35 and 38, 36, are arranged coaxially presenting a compactly constructed module. The second planetary gear unit 105 is made up of four shafts.

The summation planetary gear train 304 of FIG. 1 consists of a sun gear 71, a planet carrier 72, an internal gear 73 and another internal gear 74, as well as first planet gears 76 and second planet gears 75, which engage one another and which are mounted on a common planet carrier 72. The first shaft 53 of the summation planetary gear train is connected to the planet carrier 72. The second shaft 19 of the summation planetary gear train is joined to a sun gear 71 which engages the first planetary gears 76. The third shaft 31 of the summation planetary gear train forms the internal gear 74 and engages the second planetary gears 75. The fourth shaft 32 of the summation planetary gear train is joined to internal gear 73 which meshes with the first planetary gears 76. In this design of the summation planetary gear train 304, the fourth shaft 32 is externally disposed.

The secondary planetary gear unit 105 is constructed of four shafts and consists of two planetary gear stages 46, 44, 45, and 43, 42, 41. The first shaft 48 is joined to the internal gear 45 of the first planetary gear stage, the second shaft 47 is connected to the sun gears 43, 46 of both planetary gear stages; the third shaft 49 is permanently joined to the output shaft as well as to the planet carrier 44 of the first planetary gear stage and to the internal gear 41 of the second planetary gear stage. The planet carrier 42 forms the fourth shaft and is connected to a member of the clutch or brake 39.

The shift combinations of the transmission model of FIG. 1 are as follows:

In the first shift range, the clutch 35 is closed in order to establish a driving connection between the third shaft 31 of the summation planetary gear train and the second shaft 48 of the second planetary gear unit 105. At the same time, the clutch or brake 39 is closed in order to connect the planet carrier 42 of the second planetary gear unit to the housing 1.

In the second shift range, the clutch 36 is closed, thereby connecting the fourth shaft 32 of the summation planetary gear train to the first shaft 48 of the second planetary gear unit. The clutch 39 remains closed, as in shift range 1.

In the third shift range, the third shaft 31 of the summation planetary gear train is connected via the clutch 66 to the third shaft 49 of the second planetary gear unit, the clutch 36 remaining closed and the brake or clutch 39 is open. In the third shift range, the total power is transmitted via the third shaft 31 of the summation planetary gear train via the clutch 66 and the third shaft 49 of the second planetary gear unit directly to the output shaft 3. Through the clutch 36, the first shaft 48 of the second planetary gear unit is driven without load by the fourth shaft 32 of the summation planetary gear train. This results in control of the rotational speed of all the members of the summation planetary gear train as well as of the second planetary gear unit, and provides synchronous operation of the clutch elements involved at the range shift points.

In the fourth shift range, all members of the second planetary gear unit are blocked, for which the clutch 36 remains closed and the first and second shafts of the second planetary gear unit are blocked against each other by closing the clutch 38. The power is transmitted in this shift range via the fourth shaft 32 of the summation planetary gear train and reaches the output shaft 3 by way of the two shafts 47 and 48 of the second planetary gear unit. All shifts occur with synchronous operation of the corresponding clutch members, as with all other transmission models.

In the reverse range, the second shaft 47 of the second planetary gear unit 105 is joined to the fourth shaft 32 of the summation planetary gear train 305 via the clutch 38, and the brake 39 is joined to the housing.

Figure 2:
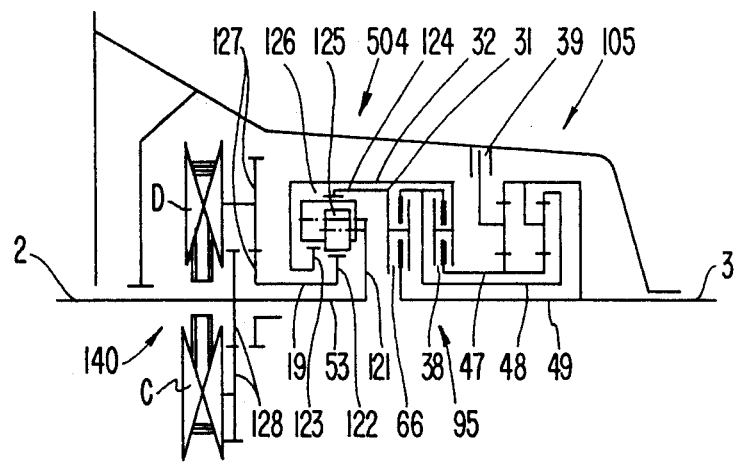
FIG. 2 is a schematic representation of a second specific embodiment with a flexible drive mechanism, four forward operating ranges and one reverse drive range.

The split-path transmission of the model in FIG. 2 is largely identical to the model of FIG. 1. It differs essentially because it incorporates another type of stepless converter 140, which, in this case, is a flexible drive mechanism, and a different planetary gear train 504. The primary unit C of converter 140 is permanently connected to the input shaft 2, as well as to a first shaft 53 of the summation planetary gear train. The secondary unit D is in permanent driving connection with the second shaft 19 of the summation planetary gear train 504. The summation gear train 504 is so designed that within each shift range the full adjustment range of the converter 140 can be utilized, i.e., the range shifts occur at the particular end of the adjustment limits concerned.

The flexible drive mechanism 140 is not adjustable through zero as is the hydrostat 40. Rather, it has an adjustment range in one direction of rotation on the order of 4 to 6. The summation planetary gear train is so constructed that with these adjustment ratios the third and fourth shafts 31 and 32 of the summation planetary gear train 504 within the shift ranges have equal rotational speed ratios, as are preset in the transmission model of FIG. 1 with hydrostatic converter 40. For this transmission, the summation planetary gear train 504 has a design as follows.

The first shaft 53 is joined to a planet carrier 121, on which first and second planetary gears 125 and 126 that engage one another are mounted, with the first planetary gears 125 engaging a sun gear 122, which is connected to the second shaft 19 of the summation planetary gear train. The third shaft 31 is connected to an internal gear 124, which engages the second planetary gears 126, and the fourth shaft 32 is connected to a sun gear 123, which is also in driving connection with the second planetary gears 126.

The shift operations of the transmission model of FIG. 2 are identical to those of the model of FIG. 1.

Depending on the type of transmission construction desired, the primary unit C can be connected either directly to the input shaft 2 or by way of a spur gear 128. The secondary unit D of the flexible drive mechanism can also be coaxially arranged with the second shaft 19 of the summation planetary gear train, or a transposed connection can be made by way of a spur gear stage 127, as shown.

Figure 4:
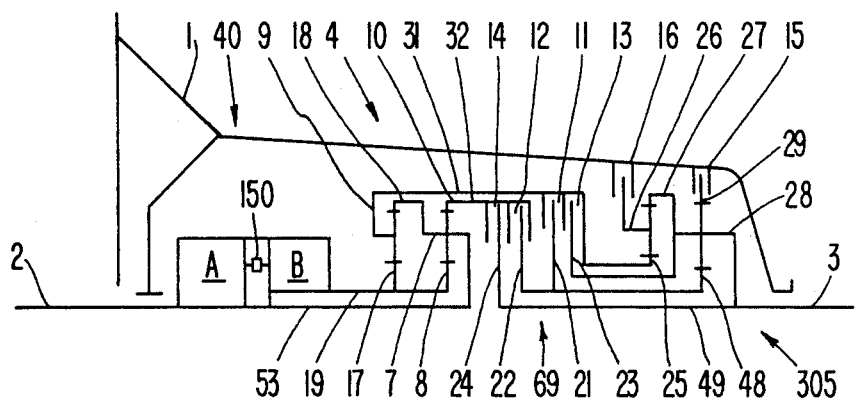
FIG. 4 is a schematic representation of a fourth specific embodiment with a hydrostatic converter, four forward operating ranges and one reverse drive range.
Figure 5:
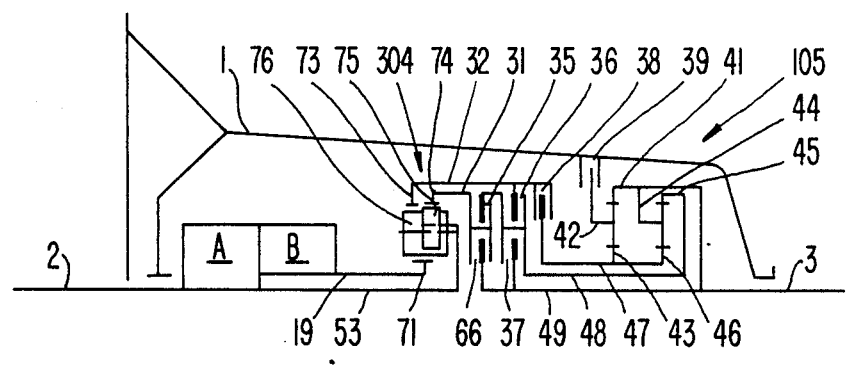
FIG. 5 is a schematic representation of a fifth specific embodiment with a hydrostatic converter, four forward operating ranges and one reverse drive range.

The split-path transmission shown in FIG. 4 also has four forward operating ranges and one reverse drive range. In the first drive range, the third shaft 31 of the summation planetary gear train 4 is connected via the clutch 11 to the first shaft, of the second planetary gear unit 305 which is the sun gear, the internal gear 29 being at the same time locked to the housing by closing the clutch (brake) 15. In the second drive range, the shaft 32 of the summation planetary gear train 4 is also coupled via the clutch 12 to the first shaft, the sun gear 48 of the second planetary gear unit 305 when the clutch 15 is closed. In the third drive range, the third shaft 31 of the summation planetary gear train is connected via the clutch 13 to the third shaft, which is the planet carrier 28, of the second planetary gear unit. In the fourth drive range, the clutch 14 joins the fourth shaft 32 of the summation planetary gear train to the planet carrier 28, the third shaft also, of the second planetary gear unit, which is permanently connected to the output shaft 3. All shifts occur with synchronous operation of the corresponding clutch elements.

For the reverse drive range, the second planetary gear unit 305 has an additional planetary gear stage 6, which, by closing a brake (clutch) 16, connects the planet carrier 26 to the housing 1, thereby providing a driving connection of the third shaft 31 of the summation planetary gear train 4 with the sun gear 25 and the internal gear 27 with the output shaft 3.

This transmission system has four power-split forward operating ranges and one power-split reverse drive range. In each drive range, the hydrostatic drive can be fully utilized in its maximum positive and negative adjustment range. That means that a very high transmission power across the corner is achieved or that one can manage with very small dimensions of the hydrostatic unit, or with a small stepless converter 40; 140 in favor of a lower power/weight ratio and power/volume ratio. Also, correspondingly lower portions of hydrostat power occur in favor of efficiency.

A particular advantage of this invention lies in the fact that, compared with another prior art transmission of this type as disclosed in German Patent No. 31 47 447, a separate starting clutch between engine and transmission is unnecessary. With this transmission system, the starting process can be triggered very advantageously by means of a clutch (brake) 39 which is already integrated into the transmission by means of a control or adjustment signal, e.g., from the engine and/or a load-dependent signal and/or manually controlled signal with continuous clutch pressure.

Alternatively, with this transmission system it is also possible to place a starting clutch 139 (FIG. 1) between an engine and the transmission in the form of a friction clutch or a hydraulic clutch, or a friction clutch combined with a hydraulic clutch as a bridging clutch. A starting clutch placed between the engine and the transmission makes sense and is appropriate whenever a vehicle is involved that makes unusually high demands on the starting clutch, which may be the case with heavy vehicles, such as buses and commercial vehicles.

If the clutch (brake) 39 integrated into the transmission is used for starting purposes, its task during the closing process is to bridge the first gear ratio range up to a certain gear ratio point X. The gear ratio point X corresponds to a certain minimum transmission or minimum velocity, which can be compared to the transmission of a first gear of a step-by-step variable transmission. The clutch (brake) 39 is designed in this case as a friction clutch and dimensioned accordingly. The continuous adjustment starts at the gear ratio point X and extends up to the final gear ratio or final velocity. With a view toward a soft, pleasant starting behavior, the clutch pressure during the closing process is continuously modulated, for example, as previously mentioned, by a signal from the engine speed and/or a load-dependent signal and/or a signal resulting from manual operation, which can correspond to the release of a clutch, for example. In transmission models with a second planetary gear unit, in accord with design 105 and 205, the starting mechanism is a brake 39, which serves for the reverse range as well as for the forward range, and even serves at the same time in the second forward operating range as a support member for the output torque in the closed state. Within the third and fourth drive ranges, the brake 39 is open.

With the model depicted in FIG. 4, the second planetary gear unit has two clutches (brakes) 15 and 16. With this model, the clutch (brake) 15 is used for the starting range in the "forward" direction and the clutch (brake) 16 is used for the "reverse" direction.

If a hydrostat 40 is used, a bypass valve 150 placed between the primary unit, hydrostatic unit A, and the secondary unit, hydrostatic unit B, and which is placed as a bypass between the high and low pressure lines of the hydrostatic drive can serve as an alternative to the starting mechanism in these models—second planetary gear unit 305—the first range clutch 11 can serve as starting clutch for the forward range. In the starting state, with the first range clutch engaged, the adjustable first hydrostatic unit A functions as a hydro-motor, and the second hydrostatic unit as a pump. As explained earlier, the summation planetary gear train 4; 104; 204; 304; 404 is so designed that in this operating state the second hydrostatic unit B is driven by the summation planetary gear train with a rotational speed which, if a bypass valve is used as a starting mechanism, is considerably higher than the rotational speed of the first hydrostatic unit A. Through the bypass function of the bypass valve 150, equilibrium in the starting state is maintained by way of the connection established between the high and low pressure lines of the hydrostatic circulation. As with the design with a starting clutch or starting brake mechanism, the bypass valve in this design is also continuously adjusted during the starting process by a control signal, in accordance with the driver's wishes or operating procedure.

The governing of the bypass valve is so attuned to the engine speed that overspeeding of the second hydrostatic unit B is prevented. The possibilities of the control signals will be described in greater detail hereinbelow under the heading "Sequence of Functions". All the range clutches 11, 12, 13, 14; or 35, 36, 38, 66 are shifted in a synchronized state and, for this reason, can be considered as form-fitted clutches or, better still, as form-fitted plus friction-locked clutches with a corresponding deflector gearing, as disclosed, for example, in Patent Application P No. 37 00 813.7, which provides the advantage of a particularly compact and cost-effective clutch mechanism for all the range clutches. Since no power is dissipated in the clutches, in contrast to other automatic transmissions, a cooling lubrication of the range clutches is not required. Associated with this is the advantage that all clutches, as mentioned, can be designed to be small, cost-effective and without drag torque. The clutch (brake) 39 (15. 16), used for the starting process, is provided with an appropriate cooling lubrication on account of the clutch power dissipation occurring, and is applied only during the starting process. With this transmission system, in which the starting clutch is integrated into the transmission and, if need be, can serve as a range clutch, costs and space are saved, in contrast to a transmission with a separate starting clutch. With this special kind of split-path transmission system, the power capacity, compared with a purely hydrostatic drive, depending on the model and vehicle conditions, is increased by more than 15 fold (degree of power increase compared to a purely hydrostatic drive). This results in a substantial reduction of the weight/power and volume/power ratios, or reduction in size of the hydrostat. The high rotational speeds, e.g., in passenger cars, can be held under control with small hydrostatic units. That means, therefore, that the high power demands of fairly large passenger cars require systems with correspondingly high power/-volume ratio, in spite of smaller hydrostatic units, i.e., with correspondingly large degree of power increase, which is provided by this transmission system. With previously mentioned transmission systems of this kind that are known from the prior art, substantially larger hydrostatic units are required.

The summation planetary gear train 4; 104; 204; 304; 404; 504 can be given different designs. Designs 304 and 504, FIGS. 1 and 2, were described above. The summation planetary gear train 4 of FIG. 4 consists of two planetary gear stages 8, 7, 10 and 17, 9 and 18. The first shaft 53 is connected to the planet carrier 7 of the first planetary gear stage 8, 7, 10 and at the same time to the internal gear 18 of the second planetary gear stage. The second shaft 19 of the summation planetary gear train is connected to the two sun gears 8 and 17. The third shaft of the summation planet gear train forms the planet carrier 9 of the second planetary gear stage 7, and the fourth shaft 32 of the summation planetary gear train is joined to the internal gear 10 of the first planetary gear stage.

Figure 6:
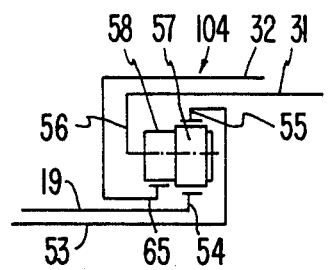
FIG. 6 is a schematic representation of a specific embodiment of the summation planetary gear train.

The summation planetary gear train 104, as can be seen from FIG. 6, has two planet gears 58 and 57 that engage each other, the first shaft 53 of the summation planetary gear train being joined to the internal gear 55 and engaging first planetary gears 57. The second shaft 19 of the summation planetary gear train is joined to the sun gear 54, which also engages first planetary gears 57. The third shaft 31 of the summation planetary gear train forms the planet carrier that bears all planet gears 57 and 58. The fourth shaft 32 of the summation planetary gear train is connected to the sun gear 65, which also meshes with second planetary gears 58.

Figure 7:
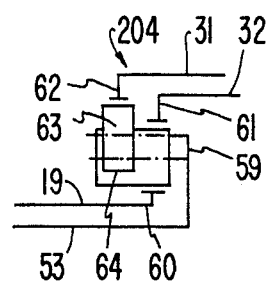
FIG. 7 is a schematic representation of a another specific embodiment of the summation planetary gear train.

The summation planetary gear train 204, as shown in FIG. 7, is also designed with meshing planet gears 64 and 63, the first shaft 53 of the summation planetary gear train being connected to the planet carrier 59, which bears all planet gears 63 and 64. The second shaft 19 is joined to a sun gear 60, which engages first planet gears 64. The third shaft 31, which in this design is the external output shaft, is joined to the internal gear 62, which engages second planet gears 63. The shaft 32, as the internal output shaft of the summation planetary gear train, is joined to the internal gear 61, which also meshes with first planetary gears 64.

Figure 3:
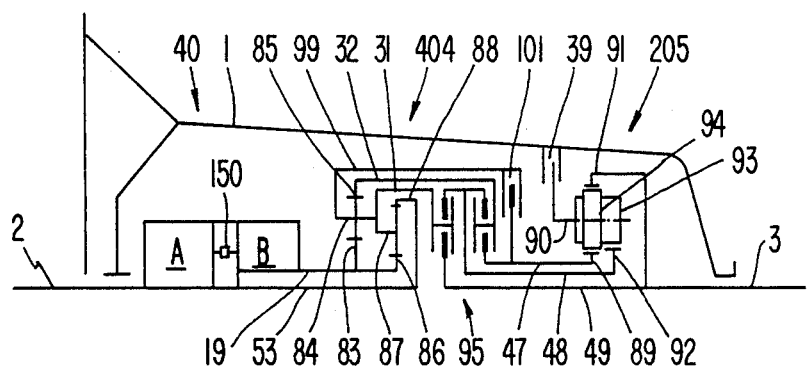
FIG. 3 is a schematic representation of another specific embodiment with a hydrostatic converter, four forward operating ranges and two reverse drive ranges.

Another design of the summation planetary gear unit 404 is shown in FIG. 3. This design consists of two planetary gear stages 86, 87, 88 and 83, 84, 85. The first shaft 53 is joined to an internal gear 88 of the first planetary gear stage; and the second shaft 19 is joined to the two sun gears 86 and 83. The third shaft 31 forms the planet carrier shafts 87 and 84 of the two planetary gear stages. The fourth shaft 32 is joined to the internal gear 85 of the second planetary gear stage. This design offers the advantage that an additional output shaft 99 is possible, which is connected to the third shaft 31 of the summation planetary gear train and is placed above the fourth shaft 32. This additional output shaft 99 can be connected to a shaft of the second planetary gear unit via a clutch 101, thereby creating an additional reverse drive range. Therefore, by using this summation planetary gear unit 404 it is possible to create a transmission with four forward operating ranges and two reverse drive ranges, with the first reverse drive range being shifted via the clutch 101 and the second reverse drive range via the clutch 38.

The second planetary gear unit 305 (FIG. 4) consists of a first planetary gear stage 48, 28, 29 and a second planetary gear stage 25, 26, 27. The first shaft of the second planetary gear unit is connected to the sun gear 48 of the first planetary gear stage, the second shaft to the sun gear 25 of the second planetary gear stage, the third shaft to the planet carrier 28 of the first planetary gear stage and to the internal gear 27 of the second planetary gear stage, as well as to the output shaft 3.

The second planetary gear unit 205 of FIG. 3 constitutes another design as an alternative to the summation planetary gear train 105. This design consists of a four-shaft planetary gear train with planetary gears 93 and 94 that engage each other, the first shaft 48 being joined to a sun gear 92, which engages first planetary gears 93 and the second shaft 47 being connected to a sun gear 89, which also meshes with second planetary gears 94. The third shaft is formed by the internal gear 91, which also cooperates with the second planetary gears 94, and is connected to the output shaft 3 and to a clutch shaft 49. The fourth shaft 90 forms the planet carrier for all the planet gears and is joined to a member of the brake 39.

Through the design of the planetary gear train, i.e., summation planetary gear train 4, 104, 204, 304, 404 second planetary gear unit 5, 105, 205, 305, any type of transmission construction is possible, which can meet specific demands of the vehicle. For vehicles with longitudinally arranged engine and transmission, e.g., passenger cars, all transmission modules—hydrostat 40, summation planetary gear train 4, 104, 204, 304, 404, the second planetary gear unit 5, 105, 205—can be arranged on a common transmission axis, as shown in FIGS. 1, 2, 3, 7 and 10.

Figure 8:
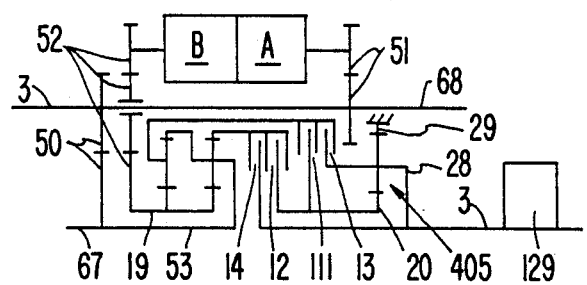
FIG. 8 is a schematic representation of a another specific embodiment with a hydrostatic drive positioned in parallel relative to a summation planetary gear train with range clutches and a second planetary gear unit.

For vehicles with a transversely arranged engine, e.g., front wheel drive passenger cars or even for heavy vehicles, the transmission components—hydrostat 40 and the split-path transmission units consisting of summation planetary gear train, range clutches and second or third planetary gear unit—can be displaced laterally and disposed in parallel with each other as shown in FIG. 8. The connection between the input shaft 3 and the first hydrostatic unit A occurs via a spur gear stage 51, and the connection between hydrostatic unit B and the summation planetary gear train occurs via a spur gear stage 52. The power-transmission connections between the input shaft 3 and the first shaft 53 of the summation planetary gear train are established via a spur gear stage 50. With this design, it is also possible to drive the transmission directly with the first shaft of the summation planetary gear train via a shaft 67.

As shown in FIG. 9, it is also possible to arrange the second planetary gear unit 105; 205; 305 and the range clutches 11, 12, 13, 14 on a common axis displaced laterally from the summation planetary gear train 4; 104; 204; 304; 404 and the input shaft 2, whereby the third shaft 31 and the fourth shaft 32 of the summation planetary gear train 4; 104; 204; 304; 404; 504 are joined to each other via a spur gear stage 77 or 78. This makes sense in particular for the transmissions of front wheel drive passenger car that require a short overall length as well as a certain distance between the input shaft and the transmission shaft. In this design, the transmission output shaft 3 is appropriately connected to a differential axle 80 via the spur gear stage 79. Preferably, the two axle drive shafts 81 and 82 drive the tractive wheels of the vehicle directly.

As mentioned earlier, with this split-path transmission, the hydrostat 40 can be consolidated into a module and accommodated in a common noise-absorbing housing in a manner in itself known. This results in the further advantage that noise-generating vibrations in the self-contained housing of the hydrostatic drive can be reduced and the whole module can be produced compactly and more cost-effectively, making modular construction possible. Another important advantage is based on the fact that, due to the novel method of construction of all single units, substantial advantages in efficiency are accomplished so that the pressure lines of the hydrostatic unit are short and connecting lines that are otherwise required can be saved so that, in addition, other advantages with regard to noise, costs and construction space can be achieved. Even with a longitudinal design of the transmission, the hydrostat 40 can be efficiently arranged in parallel to and displaced laterally from the input shaft, e.g., thereabove, in the event that in the space gained thereby a differential axle with a transverse driving axle can be installed, e.g., for the transmission of a passenger car with front wheel drive, but with a transmission arranged in longitudinal direction. With this design, the first hydrostatic unit A is joined to the input shaft via a spur gear stage not shown herein, and the second hydrostatic unit B to the second shaft 19 of the summation planetary gear train 4; 104; 204; 304; 404 also via a spur gear stage not shown. In the design, the differential axle transmission not shown in the drawings is connected via another spur gear stage not shown, between the output shaft 3 and a position shaft located therebelow and arranged parallel to the input shaft.

Thus, with the basic units: hydrostat 40, flexible drive mechanism 140, summation planetary gear train 4; 104; 204; 304; 404; 504 of the second planetary gear unit 105; 205; 305; 405 and the range clutches 69, one can make different gear combinations or types of construction in accordance with modular design.

Sequence of Functions

With reference to FIG. 1, in the starting state with selected "forward" direction of travel and brakes applied, the first range clutch 35 is closed, thereby connecting the third shaft 31 of the summation planetary gear train to the second planetary gear unit 105. The fourth shaft 42 of the second planetary gear unit 105 is driven without load, depending on the gear ratio, which corresponds to a certain minimum velocity X and with the output shaft 3 not moving. Now, for starting purposes, the clutch (brake) 39 is gradually closed. This occurs by means of a signal which is triggered either by releasing the brake pedal or by a rotational drive speed signal or by a combination of the two signals. It is also possible, by releasing the brake pedal, simultaneously to so influence the engine regulation by means of the control and regulation device that, in accordance with the output torque occurring at the moment, the engine speed is automatically increased in accordance with the engine characteristic, as, for example, from a signal of rotational speed decrease as a consequence of starting traction, the fuel feed to the engine is correspondingly increased. As an alternative to the starting mechanism by way of the clutch, one can also use the bypass valve 150 as described earlier, whereby the closing process of this valve, for bridging the first gear ratio region, is controlled and regulated via the same signals as are used for starting by means of a clutch. With both starting mechanisms, a gentle, continuous starting process can be achieved. Even a load-dependent signal, e.g., from the high pressure of the hydrostatic transmission, can so influence the starting regulation that a certain maximum traction or maximum load values of the transmission are not exceeded. As soon as the clutch (brake) 39 or, in some cases the bypass valve, is closed, the output shaft 3 has assumed a speed which corresponds to the gear ratio point "X" i.e., of a minimum velocity of the vehicle. Here, the hydrostatic unit A is still regulated to attain its maximum negative adjustment value. The hydrostat 40 is now regulated back from its negative extreme adjustment to zero and, additionally, up to its maximum positive extreme adjustment, or up to the end of the first operating range. At this point, all members of the summation planetary gear train 4; 104; 204; 304; 404 are running in synchronism. In this state, the fourth shaft 32 of the summation planetary gear train is also running in synchronism with the first shaft 31 of the summation planetary gear train, and with the first shaft 48 of the second planetary gear unit, after which, for the shifting into the second range, the clutch 36 is closed and the fourth shaft 32 of the summation planetary gear train joined to the first shaft 48 of the second planetary gear unit. At the same time, the first range clutch 35 is opened, thereby concluding the shift process from the first to the second range. The hydrostat is now readjusted in the reverse direction up to its negative extreme adjustment at the end of the second operating range. With the shift to the third operating range, the third shaft 49 and the output shaft 3 are now running in synchronism with the third shaft 31 of the summation planetary gear train, so that this shaft can be joined to the first shaft 31 by closing the clutch 66. The clutch 36 remains closed in the third range and the brake (clutch) 39 is opened, so that the power is not transmitted via the shaft 31 and the shaft 48 to the output shaft. The hydrostat is now again regulated back to its other extreme position until the fourth shift point is reached at the end of the third operating range. At this point of operation, all of the members of the summation planetary gear train and of the second planetary gear unit are running in synchronism. In this state, by closing the fourth range clutch 38, the clutch 36 is closed and the clutch 66 opened. The power added up in the summation planetary gear train 304 is now transmitted to the output shaft 3 via the fourth shaft 32 of the summation planetary gear train through two clutches 36 and 38 and the two shafts 48 and 47 of the second planetary gear train in blocked condition via the second planetary gear unit 105.

The synchronous operation of the clutch elements mentioned above contains deviations from absolute synchronous operation, which, for example, is caused by rotational speed slip of the hydrostat or of the flexible drive mechanism. With a view toward optimum shift quality, the shift point in demanding applications is corrected appropriately as a function of the load.

When used in passenger cars or in street vehicles in general, the fourth operating range can be used exclusively as an overdrive range. The shifting point is corrected as a function of load in order to achieve optimum gear-shift quality.

The clutch torque for all range clutches is relatively low, since the high output torque of the output shaft 3 is strongly gear-reduced through the second planetary gear unit in the lower operating ranges—range 1 and range 2, thus leading to the advantage that the range clutches can be designed to be small and at low cost.

A bypass valve placed between the hydrostatic units A and B is known in the art, e.g., as disclosed in German Patent No. 27 58 659. Here, however, this valve has the task of preventing deformations in the hydrostat, when two range clutches are actuated in order to unload the hydrostatic units at the corresponding gear-ratio point. Other known bypass valves have, for example, the task of compensating any regulation inaccuracies when the vehicle is not moving and at "zero" regulating position. These bypass mechanisms are unrelated to the subject of the invention.

The starting mechanism integrated into the transmission as brake 39 has the advantage of rendering unnecessary a starting clutch between engine and transmission, resulting in considerable savings in costs and space.

Instead of the stepless converter, in the form of a hydrostatic unit 40 or flexible drive mechanism 140, any other stepless converting mechanisms can be used, e.g., a frictional gear mechanism.

A particular advanatge of this transmission system of the invention is based on the fact that all clutches or shift mechanisms can be arranged between the two planetary gear units—summation planetary gear train and second planetary gear unit-thus making modular construction possible, as discussed hereinabove, as well as a cost-effective and space-saving design of the individual constructional elements.

For optimization, as is well known, the clutch control mechanism is designed so that a brief clutch overlap is present and the opening signal of the previously actuated clutch results from the pressure signal of the clutch pressure of the sequence clutch. The switching signal can be transmitted electrically or hydraulically in the usual manner.

REFERENCE SYMBOLS

| | |
|---|---|
| 1 housing | 33 |
| 2 input drive | 34 |
| 3 output drive | 35 clutch 1st + 3rd range |
| 4 summation planetary gear train | 36 clutch 2nd + 4th range |
| 5 2nd planetary gear unit | 37 clutch 3rd range |
| 6 3rd planetary gear unit | 38 clutch reverse range |
| 7 planet carrier | 39 clutch or brake 1st + 2nd + reverse range |
| 8 sun gear | |
| 9 planet carrier 1st shift shaft | 40 hydrostat |
| 10 internal gear 2nd shift shaft | 41 internal gear |
| 11 1st range clutch | 42 planet carrier = (4th shaft) |
| 12 2nd range clutch | 43 sun gear |
| 13 3rd range clutch | 44 planet carrier |
| 14 4th range clutch | 45 internal gear |
| 15 clutch or brake for starting range | 46 sun gear |
| | 47 shaft = (2nd shaft) |
| 16 clutch reverse range | 48 shaft = (1st shaft) |
| 17 sun gear | 49 shaft = (3rd shaft) |
| 18 internal gear | 50 spur gear stage |
| 19 shaft | 51 spur gear stage |
| 20 sun gear | 52 spur gear stage |
| 21 clutch member | 53 shaft |
| 22 clutch member | 54 sun gear |
| 23 clutch member | 55 internal gear |
| 24 clutch member | 56 planet carrier |
| 25 sun gear | 57 planetary gear |
| 26 plane carrier | 58 planetary gear |
| 27 internal gear | 59 planet carrier |
| 28 planet carrier | 60 sun gear |
| 29 internal gear | 61 internal gear |
| 30 | 62 internal gear |
| 31 shaft 3rd shaft of the planetary gear train | 63 planetary gear |
| | 64 planetary gear |

REFERENCE SYMBOLS -continued

| | |
|---|---|
| 32 shaft 4th shaft of the summation planetary gear train | |
| 65 sun gear | 98 clutch assembly |
| 66 clutch | 99 shaft |
| 67 input shaft FIG. 6 | 101 clutch |
| 68 input shaft | |
| 69 range clutches | |
| | 104 summation planetary gear train |
| 70 | 204 summation planetary gear train |
| 71 sun gear | 304 summation planetary gear train |
| 72 planet carrier | 404 summation planetary gear train |
| 73 internal gear | 504 summation planetary gear train |
| 74 internal gear | |
| 75 2nd planetary gear | 105 2nd planetary gear unit |
| 76 1st planetary gear | 205 2nd planetary gear unit |
| 77 spur gear stage | 305 2nd planetary gear unit |
| 78 spur gear stage | 405 2nd planetary gear unit |
| 79 spur gear stage | |
| 80 differential axle | 140 flexible drive mechanism |
| 81 axle drive shaft | 150 bypass valve |
| 82 axle drive shaft | |
| 83 sun gear | 120 sun gear |
| 84 planet carrier | 121 planet carrier |
| 85 internal gear | 121 sun gear |
| 86 sun gear | 123 sun gear |
| 87 planet carrier | 124 internal gear |
| 88 internal gear | 125 planetary gear |
| 89 sun gear | 126 planetary gear |
| 90 planet carrier | 127 spur gear stage |
| 91 internal gear | 128 spur gear stae |
| 92 sun gear | 129 reverse mechanism |
| 93 planetary gears | |
| 94 planetary gears | C = primary unit |
| 95 clutch assembly | D = secondary unit |
| 96 spur gear stage | |
| 97 spur gear stage | |

I claim:

1. A continuously variable split-path transmission having at least three forward operating ranges an including a stepless, wrap-around mechanical converter comprising a primary unit and a secondary unit, a four-shaft summation planetary gear train for adding up the power which is split from the input shaft of the transmission into multiple power transmission paths, and a downstream second planetary gear unit, wherein the input shaft is in permanent driving connection with the primary unit and with a first shaft of the summation planetary gear train and a second shaft in permanent connection with the secondary unit, and wherein third and fourth shafts of the summation planetary gear unit are selectively connetable with the second planetary gear unit.

2. A continuously variable split-path transmission having at least three forward operating ranges and including an input shaft, a stepless converter comprising a primary unit and a secondary unit, a four-shaft summation planetary gear train for adding up the power which is split from the input shaft of the transmission into multiple power transmission paths, a downstream second planetary gear unit, and an output shaft, wherein the input shaft is in permanent driving connection with the primary unit and with a first shaft of the summation planetary gear train, wherein the secondary unit is in permanent driving connection with a second shaft of the summation planetary gear unit, wherein third and fourth shafts of the summation planetary gear unit are each selectively connectable with the second planetary gear unit by a clutch or brake arranged between the units, wherein the second planetary gear unit has at least three shafts for shifting into several forward operating ranges, and wherein one shaft of the second planetary gear unit is in permanent driving connection with the output shaft.

3. A split-path transmission as set forth in claim 2, wherein the stepless converter is a hydrostatic transmission having a primary unit consisting of a hydrostatic unit of adjustable volume and a secondary unit consisting of a hydrostatic unit, preferably of constant volume, the summation planetary gear train being so designed that the range clutches preferably occur at the particular positive or negative adjustment limits of the hydrostatic transmission when the corresponding clutch elements are running in synchronization.

4. A split-path transmission as set forth in claim 2, wherein the stepless converter is a flexible drive mechanism and the primary unit is in permanent driving connection with a shaft of the summation planetary gear unit, wherein in the starting range the flexible drive mechanism is set at its maximum gear ratio so that the secondary unit can deliver the maximum torque, and wherein the summation planetary gear train is so designed that at the particular adjustment limits of the flexible drive mechanism the clutch elements of the clutch are running in synchronization for the next range shifting.

5. A split-path transmission as set forth in claim 2, wherein is provided a starting mechanism integrated into the transmission, by means of which the first operating range is bridged up to a defined gear ratio point "X" at which the continuous adjustment starts control.

6. A split-path transmission as set forth in claim 2, wherein is provided a fluid or friction starting clutch between an engine and the transmission, with which the first operating range is bridged up to a certain gear-ratio "X" at which the continuous adjustment starts.

7. A split-path transmission as set forth in claim 2, wherein the summation planetary gear train is designed with meshing first planetary gears and second planetary gears or that, alternatively, the summation planetary gear train consists of a first planetary gear stage and a second planetary gear stage.

8. A split-path transmission as set forth in claim 2, wherein the second planetary gear unit consists of two planetary gear stages, the sun gears are connected together and the planet carrier of the first planetary gear stage is connected to the internal gear of the second planetary gear stage, the internal gear of the first planetary gear stage is joined to a clutch shaft, the planet carrier of the second planetary gear stage is connected to a member of the clutch or brake and the planet carrier of the first planetary gear stage is permanently connected to the output shaft and to the internal gear of the second planetary gear stage.

9. A split-path transmission as set forth in claim 2, wherein the second planetary gear unit consists of two planetary gear stages, a first shaft of the second planetary gear unit is connected to a sun gear of the first planetary gear stage, the planet carrier of the first planetary gear stage is either permanently connected to the output shaft, to the internal gear of the second planetary gear stage, or to a member of the clutch or brake, the sun gear of the second planetary gear stage is permanently connected to the third shaft of the summation planetary gear train, the planet carrier of the second planetary gear stage is connected to a member of the clutch or brake, and the internal gear of the first planetary gear stage is either fixedly connected to the housing or to a member of the clutch or brake.

10. A split-path transmission as set forth in claim 2, wherein the second planetary gear unit consists of meshing planetary gears, a shaft engages a first one of said meshing planetary gears via a sun gear, a second shaft of the second planetary gear unit engages a second one of said meshing planetary gears via a sun gear, an internal gear likewise meshes with the second planetary gear and is permanently connected to the output shaft, and the planet carrier of the two planetary gears is at the same time connected to a member of the clutch or brake.

11. A split-path transmission as set forth in claim 2, wherein the third shaft of the summation planetary gear train is connected directly to a sun gear of the second planetary gear unit, in the first operating range the third shaft of the summation planetary gear train is connected to the first shaft of the second planetary gear unit via a clutch, in the second operating range the fourth shaft of the summation planetary gear train is likewise coupled to the first shaft of the second planetary gear unit, in the third operating range the third shaft of the summation planetary gear train is in direct driving connection with the output shaft via a clutch, and in the fourth operating range the fourth shaft of the summation planetary gear train is connected to the output shaft via a clutch.

12. A split-path transmission as set forth in claim 2, wherein a starting mechanism integrated into the transmission is provided as a brake or clutch, by means of which a first transmission range corresponding to a certain minimum velocity is bridged, whereby said clutch is either operated manually by the driver or is triggered via a corresponding vehicle regulation, preferably of an electronic regulation, and such that the clutch pressure is modulated e.g., from the engine speed signal and/or a load-dependent signal and/or a signal from the actuation mechanism of the vehicle.

13. A split-path transmission as set forth in claim 2, wherein a starting mechanism integrated into the transmission is provided which is arranged as a bypass valve between high and low pressure lines of the hydrostatic units, and which is triggered by one or more signals, thereby cancelling the bypass function in measured portions during the starting procedure, and that the control or regulating signal is, alternatively, an engine speed signal and/or a load-dependent signal and/or a signal resulting from the actuating mechanism.

14. A split-path transmission as set forth in claim 2, wherei the constructional units comprising the stepless converter, the summation planetary gear train and clutch assembly and the second planetary gear unit each form compact, self-contained, modular units which are arranged in parallel with one another.

15. A split-path transmission as set forth in claim 2, wherein the stepless converter units are arranged one behind the other and are accommodated in a noise reducing housing and arranged in any vehicle-friendly fashion in different forms of transmission.

16. A continuously variable split-path transmission as set forth in claim 2, wherein the second planetary gear unit has at least four shafts for shifting into several forward operating ranges and at least one reverse operating range.

17. A split-path transmission as set forth in claim 16, wherein the summation planetary gear train is designed with two spur gear stages, the first shaft is connected to the internal gear of a first planetary spur gear stage, the second shaft is connected to the two sun gears of the two planetary spur gear stages, the third shaft forms the planet carrier of the two planetary spur gear stages, and the internal gear of the second planetary gear stage is in driving connection with the fourth shaft, and at the same time, another shaft is provided which is likewise connected to the two planet carrier shafts of the two planetary spur gear stages and which serves as an additional clutch shaft for a transmission that can be connected via the clutch to the second shaft of the second planetary gear unit for the switching of a reverse range.

18. A continuously variable split-path transmission having at least three forward operating ranges and including a stepless converter comprising a primary unit and a secondary unit, a four-shaft summation planetary gear train for adding up the power which is split at the input of the transmission into multiple power transmission paths, and a downstream second planetary gear unit, wherein the input shaft is in permanent driving connection with the primary unit and with a first shaft of the summation planetary gear train, wherein the secondary unit is in permanent driving connection with a second shaft of the summation planetary gear unit, wherein the second planetary gear unit has at least four shafts for shifting into several forward operating ranges and at least one reverse operating range, wherein in the first operating range the third shaft of the summation planetary gear train is connected to the first shaft of the second planetary gear unit by a clutch and the planet carrier of the second planetary gear unit is connected by a clutch or brake to the housing, in the second operating range the fourth shaft of the summation planetary gear train is connected to the first shaft of the second planetary gear unit via a clutch and the planet carrier of the second planetary gear unit, as in the first operating range, likewise remains in connection with the housing via the clutch or brake, in the third operating range the third shaft of the summation planetary gear train is coupled to the third shaft of the second planetary gear unit via a clutch, whereby the first shaft of the second planetary gear unit remains connected to the fourth shaft of the summation planetary gear train via a clutch, as in the second operating range, in the fourth operating range the fourth shaft of the summation planetary gear train is connected to the first shaft and, at the same time, to the second shaft of the second planetary gear unit via clutches, and in the reverse operating range the fourth shaft of the summation planetary gear train is coupled to the second shaft of the second planetary gear unit via a clutch and, at the same time, the planet carrier of the second planetary gear unit is coupled to the housing via a clutch or brake.

19. A continuously variable split-path transmission having at least three forward operating ranges and including a stepless converter comprising a primary unit and a secondary unit, a four-shaft summation planetary gear train for adding up the power which is split at the input of the transmission into multiple power transmission paths, and a downstream second planetary gear unit, wherein the input shaft is in permanent driving connection with the primary unit and with a first shaft of the summation planetary gear train, wherein the secondary unit is in permanent driving connection with a second shaft of the summation planetary gear unit, wherein the second planetary gear unit has at least four shafts for shifting into several forward operating ranges and at least one reverse operating range, and wherein all range clutches are combined into a clutch assembly, and alternatively two clucthes at a time are placed one above the other.

20. A continuously variable split-path transmission as set forth in claim 18, wherein the second planetary gear unit has three shafts for shifting into at least three forward operating ranges without an integrated reverse range.

* * * * *

UNITED STATES PATENT AND TRADEMARK OFFICE
CERTIFICATE OF CORRECTION

PATENT NO. : 4,976,666
DATED : December 11, 1990
INVENTOR(S) : MICHAEL MEYERLE

It is certified that error appears in the above-identified patent and that said Letters Patent is hereby corrected as shown below:

Column 2, line 1, delete the second occurrence of "a";
         line 4, delete the second occurrence of "a";
         line 28, after "involved" insert a comma --,--;
         line 30, after "may" insert --be--.

Column 4, line 56, delete the comma ",";
         line 57, after "sun gear" insert --48--.

Column 5, line 31, delete the hyphen "-" and substitute a slash hyphen -- /- --;
         line 32, before "a load-dependent" delete "/or" and substitue --or--.

Column 11, line 21, "advanatge" should be --advantage--;
         line 63, "26 plane carrier" should be --26 planet carrier--.

Column 12, line 32, "stae" should be --stage--.

Column 14, line 52, "wherei" should be --wherein--.

Signed and Sealed this

Nineteenth Day of May, 1992

Attest:

DOUGLAS B. COMER

Attesting Officer      Acting Commissioner of Patents and Trademarks